United States Patent Office 3,185,657
Patented May 25, 1965

3,185,657
SOLUTIONS OF ACRYLONITRILE HOMO-
POLYMERS AND COPOLYMERS
Georges Balitrand and Pierre Lafont, Lyon, France, assignors to Rhone-Poulenc S.A., Paris, France, a corporation of France
No Drawing. Filed Nov. 29, 1962, Ser. No. 241,050
Claims priority, application France, Dec. 7, 1961, 881,277
8 Claims. (Cl. 260—30.2)

The present invention relates to solutions of acrylonitrile homopolymers and copolymers.

It is known that it is possible to obtain spinnable polyacrylonitrile solutions by heating the polymer at 95°–115° C., with a mixture of pyridine and a compound capable of forming with the pyridine a quaternary ammonium salt, such as for example benzyl chloride or ethyl chloroacetate (French Patent No. 792,624). On the other hand, pyridine alone, and its nuclear alkylated derivatives have no solvent power for these polymers and copolymers.

It has now been found that the N-oxidized compounds of nitrogen-containing heterocyclic bases constitute excellent solvents for acrylonitrile homopolymers and copolymers.

By N-oxidized compounds of heterocyclic bases are meant the oxides of heterocyclic tertiary amines such as pyridine and its nuclear alkylated derivatives, such for example as α-, β-, and γ-picolines (2-methyl-, and 3-methyl- and 4-methylpyridine, respectively), the corresponding propyl, isopropyl, butyl, isobutyl, and amyl, etc. pyridines, and the dialkylpyridines, such as 2,4-, 2,5- and 2,6-lutidines.

For example, the solid N-oxide of pyridine of the formula:

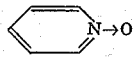

which melts at about 65° C., and which is obtained, as is known, by oxidation of pyridine with hydrogen peroxide, may be used. In addition, it has been observed that mixtures of oxides of the pyridine-containing bases extracted from coal tars also constitute good solvents for acrylonitrile polymers and copolymers. These pyridine-containing bases—consisting of mixtures of pyridine and various picolines and lutidines—are readily accessible, inexpensive starting materials, and the mixtures of N-oxides, consisting of a liquid fraction and a solid fraction (crystals melting between 40° and 50° C.), can be obtained by oxidation of the mixtures by the same method as that of pyridine itself or its nuclear alkylated derivatives.

The copolymers with which the invention is concerned are preferably binary and tertiary copolymers containing a major proportion of acrylonitrile (preferably more than 60% by weight) and a minor proportion of one or more other addition polymerisable monomers containing one or more >C=CH₂ groups. Of these other monomers, there may be mentioned vinyl chloride, vinylidene chloride, the acrylic and methacrylic esters, styrene and substituted styrenes, vinyl pyridines and vinyl alkylpyridines, and sulphonic acids containing a vinyl group, such as vinylbenzene-sulphonic and vinyloxybenzenesulphonic acids, as also their alkali metal salts.

The maximum concentration of the solutions which can be obtained may vary in accordance with the nature of the N-oxidized compound of a heterocyclic base used as solvent, the chemical nature of the polymer and its degree of polymerization, and the dissolving temperature. The differences observed when the nature of the N-oxidized compound is varied are generally rather small. On the other hand, the nature of the polymer has a greater effect. With a given temperature and a given solvent, the copolymers hereinbefore defined, and especially the binary and ternary copolymers which contain, in addition to acrylonitrile, an acrylic or methacrylic ester, vinylidene chloride or a vinyl compound comprising a sulphonic group, are more soluble than acrylonitrile homopolymers of molecular weights of the same order. The importance of these various factors will become apparent from the examples.

The more or less viscous solutions obtained in accordance with the invention are suitable for the production of shaped objects, and more especially for the spinning, in the form of textile fibres such as continuous filaments, of the acrylonitrile polymers, by known methods, for example evaporation of the solvent and coagulation by immersion in compounds which are not solvents for the polymers, such as, for example, water. The N-oxidized compounds have the advantage of being miscible with water in all proportions.

The following examples illustrate without limiting the invention.

Example I

Into 100 parts of N-oxidized compound was introduced a predetermined quantity of acrylonitrile homopolymer or copolymer, whereafter the mixture was gradually heated on the oil bath to produce a temperature rise of 2° C. per minute. At the beginning, a gelling phase occurred at a certain temperature, giving an inhomogeneous colloidal solution which is a true organogel, and then, at a temperature a few degrees higher, a clear and limpid solution was obtained. The following Table summarises the results obtained on the one hand with an acrylonitrile homopolymer (A) and on the other hand with a copolymer (B) formed of acrylonitrile (94%) and methyl methacrylate (6%) having substantially the same molecular weight (between 50,000 and 100,000). There were employed as solvents a mixture of N-oxides obtained by oxidation with hydrogen peroxide of the 115°–146° C. fraction of the pyridine-containing bases extracted from coal tars (solvent C), and the N-oxide of pyridine (solvent D).

| Parts of polymer | Dissolution temperature, ° C. | | | |
|---|---|---|---|---|
| | Polymer A | | Polymer B | |
| | Solvent C | Solvent D | Solvent C | Solvent D |
| 10 | 87 | | 69 | |
| 20 | 90 | 83 | 75 | 77 |
| 25 | 125 | | 115 | |
| 30 | 128 | 111 | 117 | 84 |
| 35 | 140 | | 117 | |
| 40 | (¹) | | 117 | |

¹ No complete dissolution at 200° C.

On cooling this solution, an organogel phase is again passed through at a temperature which is generally several degrees or even tens of degrees lower than the gelling temperature noted in the initial heating.

Example II

By proceeding as in Example I, the dissolving temperatures of various binary and ternary acrylonitrile copolymers in the mixture of N-oxides of pyridine-containing bases were measured, using in each determination 100 parts of solvent to 10 parts of polymer. These polymers had substantially the same molecular weight between 50,000 and 100,000. The results were as follows:

|  | °C. |
|---|---|
| Acrylonitrile-vinylidene chloride copolymer (71.6/28.4) | 72 |
| Acrylonitrile-vinyloxybenzenesulphonic acid copolymer (98/2) | 110 |
| Acrylonitrile - methylmethacrylatevinyloxybenzenesulphonic acid terpolymer: | |
| Composition 93/6/1 | 77 |
| Composition 788/20/2 | 44 |
| Acrylonitrile - vinylidenechloride vinyloxybenzenesulphonic acid terpolymer (71/28/1) | 38 |

These temperatures may be compared with those observed in Example I, namely,

|  | °C. |
|---|---|
| Acrylonitrile homopolymer | 87 |
| Acrylonitrile-methylmethacrylate copolymer (94/6) | 69 |

We claim:

1. Solution of acrylonitrile homopolymers and copolymers containing at least 60% by weight of acrylonitrile residues in a compound selected from the group consisting of N-oxides of pyridine, picolines, lutidines and mixtures thereof.

2. Solutions according to claim 1, wherein the acrylonitrile polymer is a homopolymer.

3. Solutions according to claim 1, wherein the acrylonitrile polymer is a copolymer of at least 60% by weight of acrylonitrile with up to 40% by weight of at least one other addition polymerizable monomeric compound containing the group $CH_2=C<$.

4. Solutions according to claim 1, wherein the solvent comprises a mixture of N-oxides derived from the mixture of pyridine, picolines and lutidines obtained from coal tar.

5. A process for the production of shaped articles of acrylonitrile homopolymers and copolymers containing at least 60% by weight of acrylonitrile residues, which comprises shaping and coagulating a solution of a said polymer in an N-oxidized compound selected from the class consisting of the N-oxides of pyridine, picolines, lutidines and mixtures thereof.

6. A process for the production of shaped articles of acrylonitrile homopolymers and copolymers containing at least 60% by weight of acrylonitrile residues, which comprises shaping and coagulating a solution of a said polymer in the mixture of N-oxides obtained by N-oxidizing the mixture of pyridine, picolines, and lutidines obtained from coal tar.

7. A process according to claim 5 wherein the solution is coagulated by contact with water.

8. A process according to claim 5 wherein the solution is coagulated by contact with water.

References Cited by the Examiner

UNITED STATES PATENTS

| 2,995,562 | 8/61 | Ames et al. | 260—297 |
| 3,047,579 | 7/62 | Whitman | 260—297 |

ALEXANDER H. BRODMERKEL, *Primary Examiner.*

MORRIS LIEBMAN, *Examiner.*